United States Patent [19]

Jamoua et al.

[11] Patent Number: 5,233,964
[45] Date of Patent: Aug. 10, 1993

[54] UNIVERSAL CONTROL OF A PLURALITY OF FUEL INJECTORS FOR AN INTERNAL COMBUSTION ENGINE

[75] Inventors: Saad A. Jamoua, Oak Park; Kevin M. Flannery, Dearborn, both of Mich.

[73] Assignee: Ford Motor Company, Dearborn, Mich.

[21] Appl. No.: 774,500

[22] Filed: Oct. 10, 1991

[51] Int. Cl.$^5$ .................. F02D 41/28; F02D 41/34
[52] U.S. Cl. .................. 123/479; 123/487; 364/431.05; 364/431.12
[58] Field of Search .......... 123/487, 490, 479, 480; 364/431.05, 431.12

[56] References Cited

U.S. PATENT DOCUMENTS

| | | |
|---|---|---|
| 3,893,432 | 7/1975 | Krupp et al. . |
| 3,906,205 | 9/1975 | Yoshida et al. ............... 235/105.21 |
| 4,034,720 | 7/1977 | Noguchi et al. . |
| 4,116,169 | 9/1978 | Krupp et al. . |
| 4,133,326 | 1/1979 | Cops et al. . |
| 4,209,829 | 6/1980 | Leichle ............... 364/442 |
| 4,209,833 | 6/1980 | Krupp et al. ............... 364/569 |
| 4,250,858 | 2/1981 | Jeenicke et al. ............... 123/480 |
| 4,255,789 | 3/1981 | Hartford et al. ............... 364/431 |
| 4,309,759 | 1/1982 | Tokuda et al. ............... 123/480 |
| 4,370,962 | 2/1983 | Hosaka ............... 123/480 |
| 4,387,429 | 6/1983 | Yamauchi et al. ............... 123/480 |
| 4,478,185 | 10/1984 | Obayashi et al. ............... 123/419 |
| 4,489,689 | 12/1984 | Avian et al. ............... 123/417 |
| 4,576,135 | 3/1986 | Johnson ............... 123/490 |
| 4,855,919 | 8/1989 | Bergholz et al. ............... 123/417 |

FOREIGN PATENT DOCUMENTS 3541884 6/1987 Fed. Rep. of Germany ...... 123/480

OTHER PUBLICATIONS

Hitachi Paper #890765, pp. 141-149, "Six Cylinder EFL Control Using a Low-Cost Microcontroller and the Universal Pulse Processor IC", by Problas Kyrwal & Robin Blanton.

*Primary Examiner*—Andrew M. Dolinar
*Attorney, Agent, or Firm*—Roger L. May; Peter Abolins

[57] ABSTRACT

Auxiliary control is used to reduce the processing load of an engine control computer by directly controlling a fuel injection system of an internal combustion engine. After initial set up, an auxiliary controller is able to control up to eight injectors while only receiving delay times from engine operating events, e.g. power stroke of each associated cylinder, and pulse width time periods defining the activation times for the injectors. The auxiliary controller can also maintain limited engine operation in the event of failure of the engine control computer when the computer is unable to provide updated delay times and pulse width time periods. A delay time and a pulse width time period are continuously calculated by the engine control computer and provided to the auxiliary controller. The most recently received delay time and pulse width time period are then used by the auxiliary controller to control up to eight identified fuel injectors. The auxiliary controller needs to be set up only one time during each engine operating period. By initializing the auxiliary controller each time it is used, the auxiliary controller can be made universal in that one controller design can be used to interchangeably service a large variety of engines.

8 Claims, 5 Drawing Sheets

UNIVERSAL CONTROL OF A PLURALITY OF FUEL INJECTORS FOR AN INTERNAL COMBUSTION ENGINE

BACKGROUND OF THE INVENTION

The present invention relates generally to computer controlled engine systems and, more particularly, to a method and apparatus for performing engine control operations in response to limited control signals generated by an engine control computer. While the present invention is applicable to ignition systems, fuel injection systems and other operating systems of an internal combustion engine, it will be described with reference to a fuel injection system for which it is initially intended.

Computer engine controllers must monitor a variety of input signals representative of the operating conditions of engines which they are controlling. Based on these input signals, the controllers determine ignition times and fuel injection times and durations which in turn are used to control engine ignition systems and fuel injection systems. While the computers are particularly adept at signal acquisition and utilization of engine operating signals to calculate engine control signals, the computers also typically use the signals to control the engine systems.

Unfortunately, the computers tend to be less adept at controlling engine systems and hence these operations require an inordinate amount of the processing time of the computers. The burden of performing these control operations, such as the control of fuel injectors, becomes more and more troublesome as the computers are required to perform more and more operations due to tighter engine control requirements.

There is thus a need for an auxiliary controller which can reduce the processing load of engine control computers to enable the computers to perform evolving and more complicated engine control calculations. Preferably, such an auxiliary controller would be universal, i.e. readily configurable for a large variety of engines such that a single controller could be provided for many applications. It is apparent that a single controller part which can be used on a large variety of engines would result in reduced costs both due to increased numbers of the part made and also to reduced inventory requirements, of a single part. An additional attractive feature would be a computer fault mode which would enable engine operation, albeit of a limited nature, in the event of failure of that portion of a computer which controls the auxiliary controller.

SUMMARY OF THE INVENTION

This need is met by the methods and apparatus of the present invention wherein auxiliary control is used to reduce the processing load of an engine control computer by directly controlling one or more engine control systems. While the present invention is applicable to ignition systems, fuel injection systems and other operating systems of an internal combustion engine, it will be described with reference to a fuel injection system for which it is initially intended.

In a fuel injection system, an auxiliary controller in accordance with the present invention is able to control individual injectors of the system while only receiving delay times from engine operating events, e.g. power stroke of each associated cylinder, and pulse width time periods defining the activation times for the injectors. The auxiliary controller can even maintain limited engine operation in the event of failure of the engine control computer when the computer is unable to provide updated delay times and pulse width time periods. While an illustrated embodiment of the auxiliary controller can control up to eight injectors of a fuel injection system, it is noted that the invention is not so limited but can control up to twelve, sixteen or any reasonable number of injectors by means of expansion which will be apparent from the following detailed description of the invention.

In a preferred embodiment, a delay time and a pulse width time period are continuously calculated by the engine control computer and provided to an auxiliary controller. The most recently received delay time and pulse width time period are then used by the auxiliary controller to control one or more identified fuel injectors. The auxiliary controller needs to be set up only one time during each engine operating period or injector set up can be maintained either by read only memory (ROM) techniques for permanent set-up or by providing a "sleep mode" or back-up power such that the auxiliary controller can maintain injector identification between engine operating periods.

Since initial set up of an auxiliary controller requires minimal time and can be easily performed prior to engine start-up, this mode of operation is preferred. By initializing the auxiliary controller each time it is used, the auxiliary controller can be made universal in that one controller design can be used to service a large variety of engines without any modification by way of ROM or otherwise. Of course, a single universal controller design also has the advantage of more easily supporting construction of the auxiliary controller as a custom integrated circuit since the costs of development can be spread over a larger number of engines/-vehicles.

In accordance with one aspect of the present invention, a universal controller for controlling a plurality of electronic fuel injectors of an internal combustion engine comprises first register means for receiving controller configuration data defining electronic fuel injectors to be controlled. Second register means receive pulse width data and time delay data required for current control of the defined electronic fuel injectors. Circuit means responsive to the contents of the first and second register means generate control signals for the electronic fuel injectors such that the electronic fuel injectors are controlled in accordance with current demands of the internal combustion engine. Current engine demands are provided to the controller via engine operation dependent updates of data received within the second register means.

In the preferred embodiment, the circuit means includes delay and pulse width counters, and means for loading the delay and pulse width counters with the time delay data and the pulse width data, respectively, prior to operation. Thus, whenever the controller is updated by new pulse width data and time delay data, the updated data is used for the next injector control operation. Preferably, the universal controller is formed as an integrated circuit chip and can be configured via the first register means to control up to eight electronic fuel injectors.

In the event of failure of a primary engine controller which operates the universal controller, limited engine operation means is coupled to the circuit means for operating the universal controller with a predefined delay time and a predefined pulse width time period. In this way, the electronic fuel injectors of an internal combustion engine can continue to be operated in a "limp home" limited mode of operation. In one working experimental embodiment, the predefined delay time is equal to zero.

In accordance with another aspect of the present invention, a control system for an internal combustion engine comprises a primary engine control computer for monitoring the engine and generating control signals for the engine, the engine control signals including engine control data. The primary engine control computer controls an auxiliary controller associated with an engine system to be controlled by engine control signals generated by the primary engine control computer. The auxiliary controller comprises first register means for receiving controller configuration data defining the engine system to be controlled, and second register means for receiving engine control data required for current control of the engine system to be controlled. Circuit means responsive to the contents of the first and second register means generate control signals for the engine system such that the engine system is controlled in accordance with current demands of the internal combustion engine which are provided to the auxiliary controller via updates of data received within the second register means.

If the engine system controlled comprises a fuel injection system, the engine control data comprises pulse width data and time delay data required for current control of the fuel injection system. For a fuel injection embodiment of the present invention, the circuit means includes delay and pulse width counters, and means for loading the delay and pulse width counters with the time delay data and the pulse width data, respectively, prior to operation. In this way, the auxiliary controller can be updated at any time by new pulse width data and time delay data which is used for the next control operation performed on the fuel injection system. Preferably, the auxiliary controller is formed as an integrated circuit chip and can be configured via the first register means to control up to eight electronic fuel injectors.

In accordance with yet another aspect of the present invention, a method of controlling a plurality of electronic fuel injectors of an internal combustion engine comprises the steps of: identifying fuel injectors to be controlled; providing a current delay time from recurring events within the internal combustion engine for activating the identified fuel injectors, the delay time being dependent upon engine operation; providing a pulse width time period defining the activation times of the identified fuel injectors, the pulse width time period being dependent upon engine operation; and, applying the delay time and the pulse width time period in accordance with the identified fuel injectors to control the identified fuel injectors. The step of identifying fuel injectors to be controlled may comprise the steps of: storing a firing sequence for the internal combustion engine including the fuel injectors to be controlled; and, storing a mode of operation for the fuel injectors to be controlled.

The method may further comprise the step of storing injector enable signals to enable operation only of the fuel injectors to be controlled. In the preferred embodiment, the fuel injectors are controlled in response to a crankshaft position signal and the method further comprises the step of storing a divisor for the crankshaft position signal to adapt the crankshaft position signal to the mode of operation of the fuel injectors to be controlled.

In accordance with still another aspect of the present invention, a method of controlling a plurality of electronic fuel injectors of an internal combustion engine in response to crankshaft position signals including the identification of number one cylinder compression stroke, repetitively updated delay times from recurring positions of the crankshaft and repetitively updated pulse width times defining the activation times for identified fuel injectors comprises the steps of: storing identification of fuel injectors to be controlled; storing an operating mode for the identified fuel injectors to be controlled; generating fuel injector enabling signals in response to the crankshaft position signals; activating enabled fuel injectors after elapse of a current delay time; and, disabling activated fuel injectors after elapse of a current pulse width time.

In accordance with another aspect of the present invention, a method of controlling a plurality of electronic fuel injectors of an internal combustion engine from a primary control computer by the addition of a universal fuel injector controller to reduce the control operations required to be performed by the primary control computer comprises the steps of: generating initialization signals which are passed from the primary control computer to the universal fuel injector controller to identify a number of fuel injectors to be controlled and the fuel injector control mode; repeatedly generating a delay time from a recurring event within the internal combustion engine for activation of the fuel injectors and a pulse width time period defining a time period for the activation of the identified fuel injectors, delay times and pulse width times being generated by the primary control computer and passed to the universal fuel injector controller; and, applying the delay times and the pulse width times in accordance with the identified fuel injectors to control the identified fuel injectors by generation of fuel injector control signals by the universal fuel injector controller.

The step of applying the delay times and the pulse width times to control the identified fuel injectors may comprise the steps of: loading a current delay time into a delay counter corresponding to the fuel injector to be activated; loading a current pulse width time period into a pulse width counter corresponding to the fuel injector to be activated; activating the delay counter; activating the fuel injector to be activated upon the delay counter reaching a defined count; activating the pulse width counter; and, deactivating the fuel injector to be activated upon the pulse width counter reaching a defined count whereby updates of the delay times and pulse width time periods can be made at any time and are utilized for control of the next fuel injector to be activated.

Preferably, the method provides for operation of the fuel injectors in the event of failure of the primary control computer and further comprises the steps of: generating limited operation fuel control signals in accordance with a predefined delay time and a predefined pulse width time period for limited operation of the engine; and, forcing selection of the limited operation fuel control signals for controlling the fuel injectors. In a working experimental embodiment of the present invention, the predefined delay time is equal to zero.

It is thus a feature of the present invention to provide methods and apparatus for reducing the processing load on an internal combustion engine primary control computer by means of an auxiliary controller which can control an operating system associated with the engine in response to limited engine control data relative to the operating system; to provide methods and apparatus for reducing the processing load on an internal combustion engine primary control computer by means of an auxiliary controller which can control a fuel injection system of the engine in response to delay time data and pulse width data which data is provided by the primary computer to the auxiliary controller; and, to provide methods and apparatus for reducing the processing load on an internal combustion engine primary control computer by means of an auxiliary controller which can control a fuel injection system of the engine even in the event of failure of the primary control computer.

Other features and advantages of the invention will be apparent from the following description, the accompanying drawings and the appended claims.

DETAILED DESCRIPTION OF THE INVENTION

While the present invention is generally applicable to ignition systems, fuel injection systems and other operating systems of an internal combustion engine, it will be described with reference to a fuel injection system for which it is initially intended. An illustrative embodiment of an auxiliary controller 100 is shown in schematic block diagram form in FIG. 1. The auxiliary controller 100 is constructed and operable in accordance with the present invention to be a sequential circuit universal controller in that it can be initialized by a primary engine control computer 102 to adapt the controller 100 to a number of variables corresponding to the engine system to be controlled.

Figure 1:
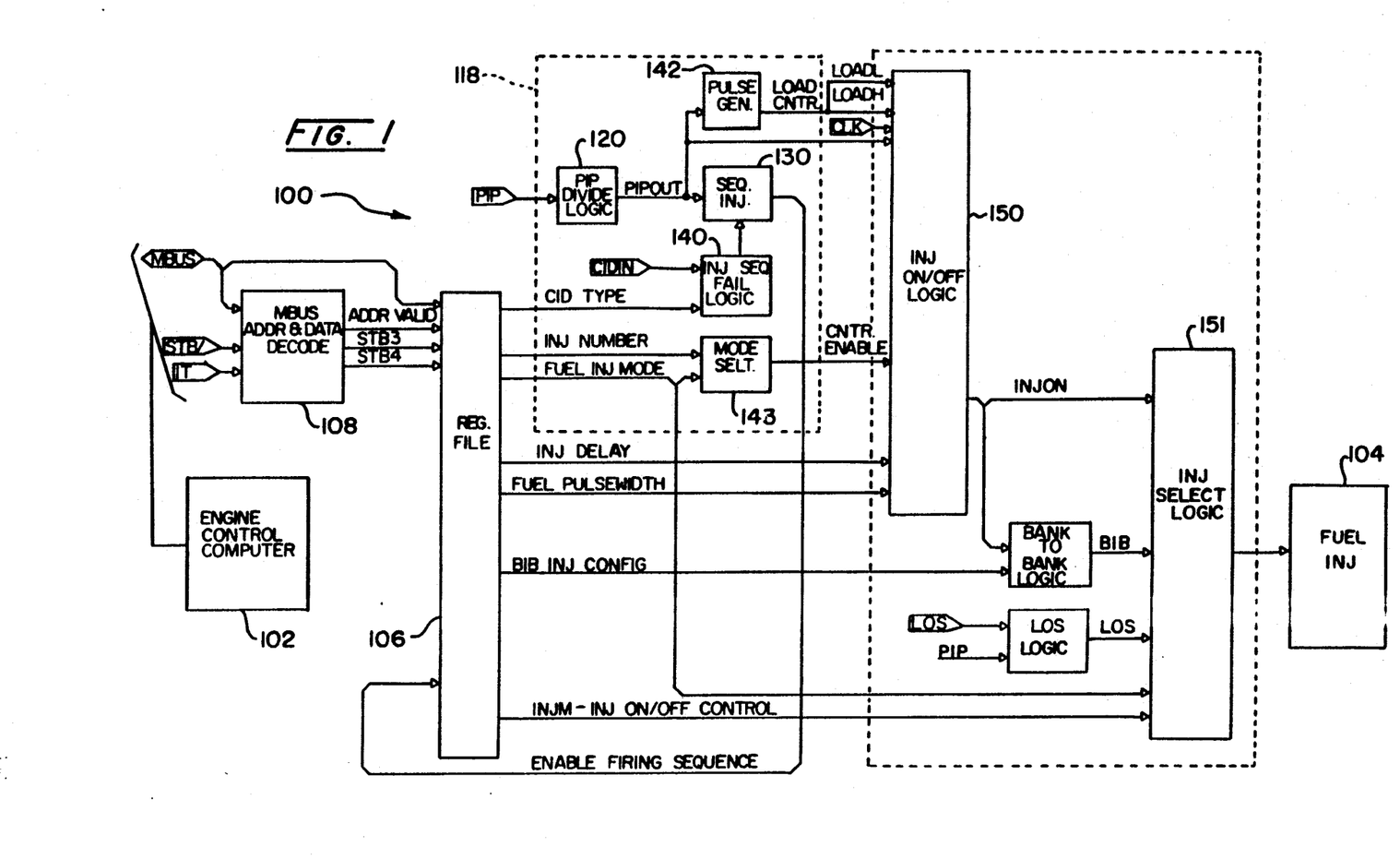
FIG. 1 is a schematic block diagram including an auxiliary controller operable in accordance with the present invention.

For use of the auxiliary controller 100 in the control of a fuel injector system for an internal combustion engine, the controller 100 can be initialized to control individual ones of a plurality of fuel injectors 104. The illustrated embodiment of the auxiliary controller 100 can be set up to control up to eight fuel injectors; however, it is noted that any reasonable number of fuel injectors can be controlled in accordance with the present invention, for example internal combustion engines including twelve, sixteen or more fuel injectors can be controlled.

The auxiliary controller 100 will be described for operation with an Intel-8061 Microcontroller as the primary engine control computer 102 with control being via the MBUS of the Intel-8061 Microcontroller. However, it is to be understood that only minor modifications readily apparent to those skilled in the art are required for operation of the auxiliary controller 100 with other commercially available microcontrollers.

Figure 3A:
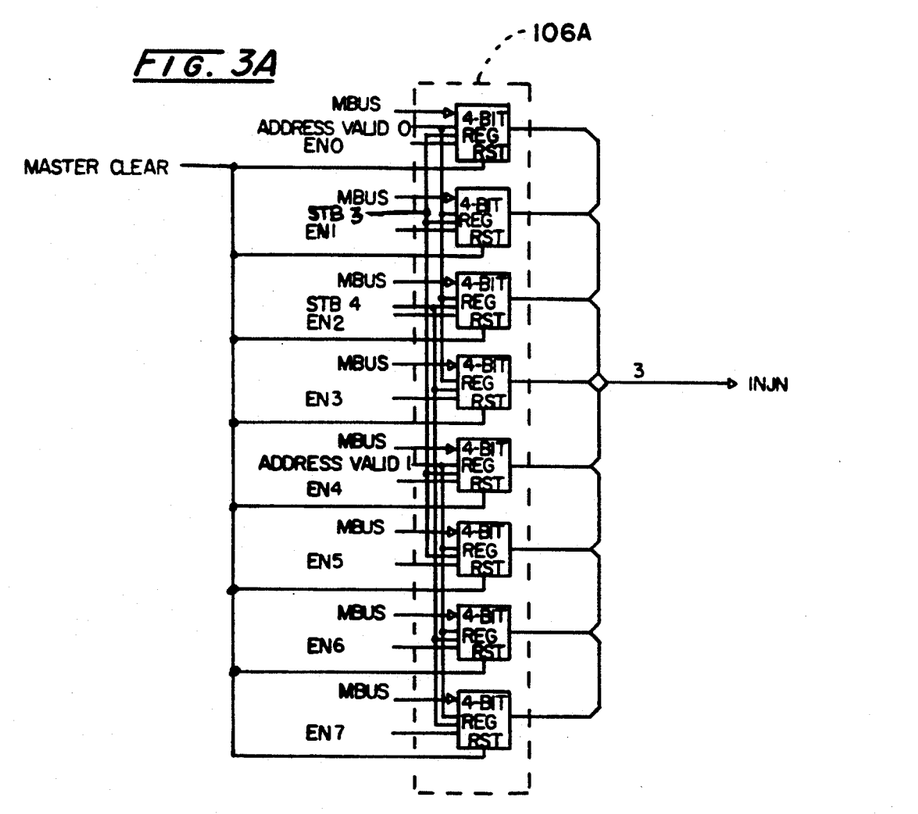
FIGS. 3A and 3B in combination form a schematic block diagram for the register file of the auxiliary controller of FIG. 1.
Figure 3B:
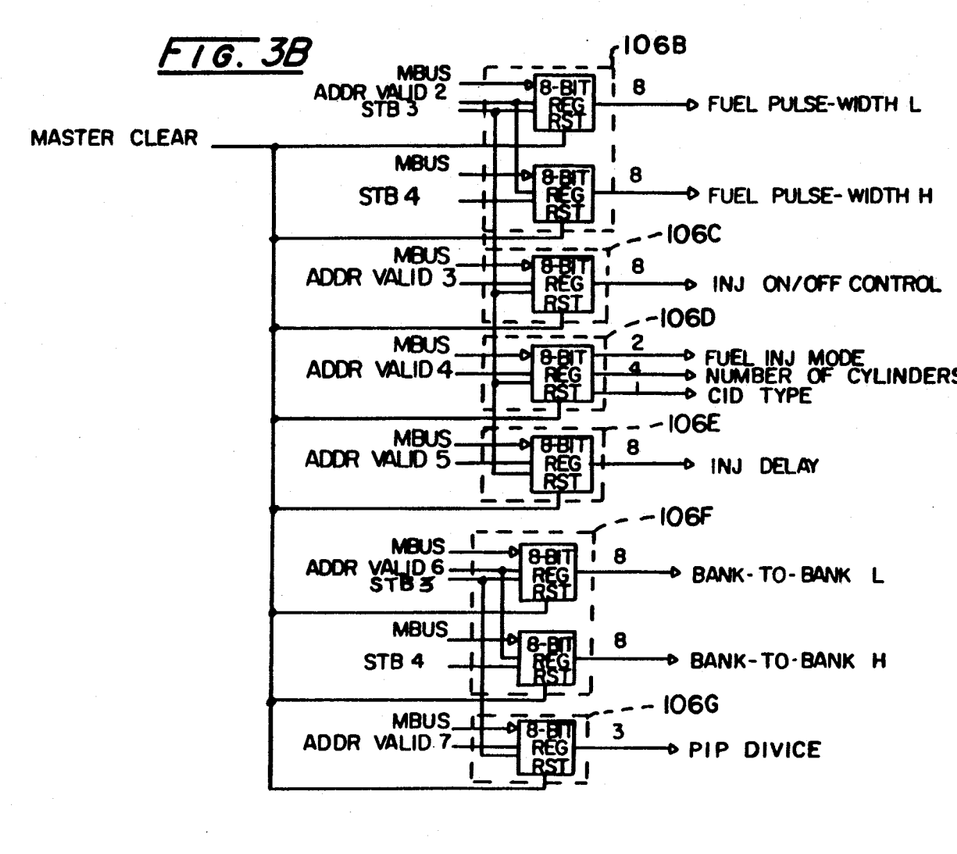

The auxiliary controller 100 is initialized and controlled by writing control configuration data to first register means, and pulse width data and time delay data to second register means. The first and second register means make up a register file 106 which comprises a set of eight control registers mapped into the address space of the primary engine control computer 102. The control registers are shown in FIGS. 3A and 3B and include a firing sequence register 106A made up of eight 4-bit registers which are sequentially accessed to define the injector numbers of injectors to be activated or fired.

A fuel pulse width register 106B is made up of two 8-bit registers to define 8 low bits and 8 high bits of pulse width data or a total of 16 bits of pulse width data. The pulse width data defines the activation time periods for the fuel injectors 104. While only one fuel pulse width register 106B is included in the illustrated embodiment of the present invention, it is noted that additional fuel pulse width registers can be provided. For example, a fuel pulse width register can be provided for each injector such that individual cylinder fuel control can be provided in accordance with the present invention. Individual cylinder fuel control may be based on monitored cylinder conditions such as pressures within the cylinders so that the primary engine control computer 102 can fine tune the injection of fuel for each cylinder of an engine being controlled.

A fuel injector on/off control register 106C comprises an 8-bit register and is used to enable, logical "0", or disable, logical "1", operation of corresponding ones of the fuel injectors 104. While the auxiliary controller 100 is typically set up only once prior to engine operation, it is possible for the primary engine control computer 102 to modify the set up at any time during engine operation. Accordingly, if diagnostics within a controlled engine indicate that a fuel injector is faulty, that fuel injector can be disabled on the fly by the primary engine control computer 102 modifying the set up data contained in the fuel injector on/off control register 106C.

A control register 106D comprises an 8-bit register which stores 2-bits of mode information; 4-bits representing the number of cylinders of the engine to be controlled; and, 2-bits of cylinder identification input (CIDIN) signal type data, i.e. active on the rising edge or active on the falling edge of the CIDIN signal. The CIDIN signal is a two state, 50% duty cycle, signal generated by the engine being controlled and identifies the compression stroke of the number 1 cylinder.

A time delay register 106E comprises an 8-bit register. The time delay data received in the time delay register 106E defines the time periods the controller 100 is to delay after the occurrence of recurring engine operating events, e.g. a defined crankshaft position often 10° before top dead cylinder (BTDC), before activating one or more corresponding fuel injectors. The recurring engine operating events are defined by a profile ignition pickup (PIP) signal which is generated by the engine being controlled. Here again, a plurality of time delay registers could be provided to fine tune the injection of fuel for each cylinder of an engine being controlled in a manner similar to that described above for the fuel pulse width register 106B.

A bank-to-bank configuration register 106F is made up of two 8-bit registers to designate two banks with injectors on a given bank being enabled, logical −1", or disabled, logical "0".

Finally, a profile ignition pickup((PIP) signal divider register 106G comprises 3-bits of an 8-bit register to define a PIP signal divide rate of from 1 to 8. The profile ignition pickup (PIP) signal is a two state, 50% duty cycle, signal generated by the engine to be controlled to provide crankshaft position reference for each of the cylinders of the engine to be controlled. Here again, the PIP signal often defines a crankshaft position of 10° BTDC for each of the cylinders.

In addition to MBUS, CIDIN and PIP, the auxiliary controller 100 receives the following input control signals. A strobe not (STB/) signal whose leading edge, negative transition, defines when data on the MBUS is valid. The STB/ pulse is nominally equal to one crystal period of the Intel-8061 Microcontroller in the illustrated embodiment. An instruction transfer (IT) signal is a two state signal that defines the type of data being transferred across the MBUS. When high, logical "1", it indicates that set up instructions or set up addresses are on the bus; and when low, logical "0", it indicates that data or data addresses are on the bus. A limited operation strategy (LOS) signal is an input pulse whose leading edge, negative transition, activates the limited operation strategy as will be discussed later herein.

The mode information data written into the control register 106D sets up the auxiliary controller to operate in one of the following fuel delivery modes. Sequential electronic fuel injection (SEFI) mode wherein fuel injectors are fired sequentially based on the sequence set up in the firing sequence register 106A. Bank-to-bank (BTB) mode wherein fuel injectors are grouped into two banks based on bank configuration data set up in the bank-to-bank configuration register 106F. Banks can be fired in the following modes: alternate mode wherein banks are fired alternately based on a set up firing sequence; simultaneous (SIM) mode wherein both banks are fired simultaneously; and, centralized mode wherein one or two injectors are operated to perform centralized fuel injection (CFI).

Once the auxiliary controller 100 has been initialized or set up to define the parameters of the fuel injection or other engine system to be controlled, the primary engine control computer 102 needs only to update the pulse width data and time delay data such that the data corresponds to current operating conditions of the engine being controlled. However, the primary engine control computer 102 can modify the parameters of the fuel injection system for enhanced operation of the system for example to correct for injector failure as previously noted.

Figure 2:
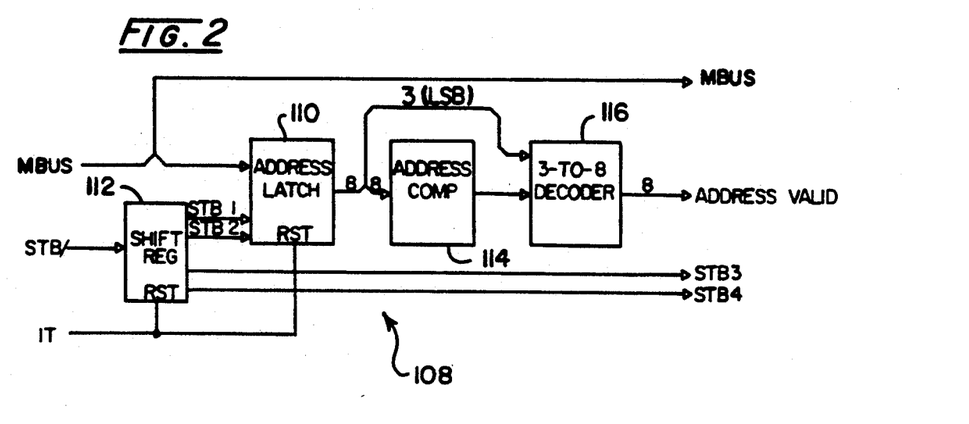
FIG. 2 is a schematic block diagram of the MBUS address and decode block of the auxiliary controller of FIG. 1.

The MBUS address and decode block 108 of the auxiliary controller 100 shown in FIG. 2 interfaces the controller 100 to an Intel-8061 Microcontroller. It is noted that only minor modification are needed to adapt the block 108 for operation with other commercially available microcontrollers. The block 108 maps the set of eight control registers 106A-106F into the memory address space (addresses 0A00-0A07 Hex) of the Intel-8061 Microcontroller.

The block 108 comprises a 16-bit address latch 110 which stores addresses received from the MBUS. A shift register 112 converts serial-in STB/ pulses to parallel-out level control signals. An address comparator 114 is used to determine if one of the mapped registers is being addressed. An address decoder 116 decodes the lowest 3-bits of the address to define a set of eight write strobes for the eight control registers 106A-106F which control the operation of the controller 100 during normal operation.

Writing to the control registers 106A-106F is achieved using the following sequence: the IT signal transitions to a low level, logical "0", to enable the shift register 112 and the address latch 110. The first high-to-low transition of the STB/ signal generates a low-to-high transition on STB1 which in turn clocks the low byte of the address, currently on the MBUS, into address latch 110. The second high-to-low transition of the STB/ signal generates a low-to-high transition on STB2 which in turn clocks the high byte of the address, currently on the MBUS, into the address latch 110. At this time, the address comparator 114 determines if the address is in the range 0A00-0A07 Hex. If so, the outputs of the address comparator 110 enables the address decoder 116. The least 3 significant bits of the address is decoded into 8 clock enable signals, of which, only one is true in any given input combination. The third high-to-low transition of the STB/ signal generates a low-to-high transition on STB3 which clocks the MBUS data into the control register currently addressed, see FIGS. 3A and 3B. For word writes, a fourth high-to-low transition of the STB/ signal will generate a low-to-high transition on STB4 which in turn clocks the high byte of the data into the currently addressed control register.

Figure 4:
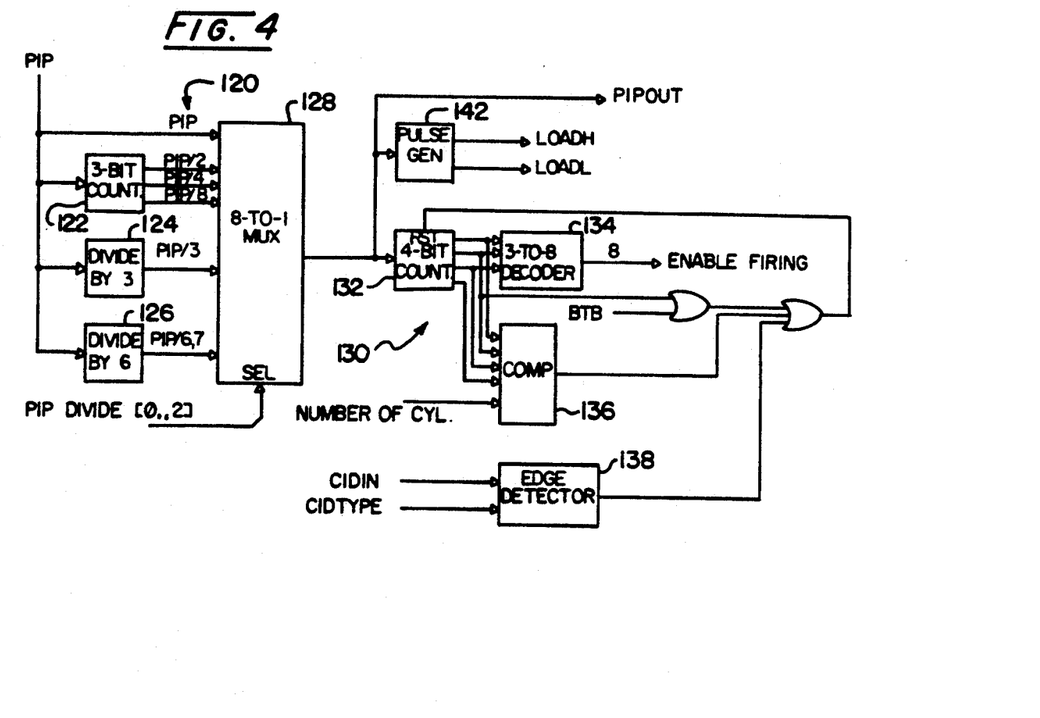
FIG. 4 is a schematic block diagram of firing sequence logic for the auxiliary controller of FIG. 1.

Fuel injector sequence control logic is provided by the block 118 of the controller 100 of FIG. 1. Fuel injection is synchronized to the rising edge of the PIP signal and, depending on the selected fuel delivery strategy, fuel injection events vary from every PIP event to every eighth PIP event. A PIP frequency divide logic circuit 120 provides the following divided PIP signals: PIP/2; PIP/3; PIP/4; PIP/6; and, PIP/8. As shown in FIG. 4, the PIP frequency divide circuit comprises a 4-bit counter 122 with the PIP signal as the clock input is used to generate PIP/2, PIP/4, PIP/8 signals. A 4-bit counter 124 with the PIP signal as the clock input and reset when the count reaches 3, is used to generate the PIP/3 signal. A 4-bit counter 126 with the PIP signal as the clock input and reset when the count reaches 6 is used to generate the PIP/6 signal. Since PIP/5 and PIP/7 are not valid firing frequencies and therefore not provided, instead the PIP/4 and PIP/6 signals are selected when PIP/5 and PIP/7 are requested.

An 8-to-1 multiplexer 128 is used to select the requested PIP signal based on the 3-bit divider set up in the PIP signal divider register 106G. The selected PIP signal is referred to as a PIPOUT signal hereinafter. The PIPOUT signal is used to sequence the firing of the fuel injectors 104 by enabling the firing sequence registers 106A via an injection sequence logic block 130 which includes a 4-bit firing sequence counter 132, see FIG. 4, which receives the PIPOUT signal as its clock input. Three of the output signals from the counter 132 are decoded by a 3-to-8 decoder 134 into 8 signals used to enable the firing sequence registers 106A. The PIPOUT signal operates a pulse generator 142 to generate LOADH and LOADL signals which are used to load the contents of the fuel pulse width register 106B into pulse width counters which are provided for each of the fuel injectors 104 as will be described.

The counter 132 is reset by one of the following events: the true condition of the CIDIN signal resets the firing sequence counter 132 to a zero count via an edge detector 138 which forms a portion of injection sequence failure block 140 of FIG. 1 to enable the first register of the firing sequence registers 106A. For bank-to-bank alternate firing, the counter 132 is reset on a count of 2. For sequential firing the counter 132 is reset when the count is equal to the set number of cylinders by means of a 4-bit comparator 136. The later two resets are normally superfluous but are added to ensure continued synchronization if the CIDIN signal is lost. The CIDIN signal can be processed on either the rising or falling edge based on the CIDIN signal type bit set in the control register 106D. Location of the selected edge of the CIDIN signal within the engine firing cycle determines which injector number is to be set in the first register of the firing sequence register 106A. For example, if the engine firing sequence is 1,3,4,2 and the CIDIN edge occurs close to top dead cylinder (TDC) of the power stroke, then the set firing sequence should be 3,4,2,1.

Figure 5:
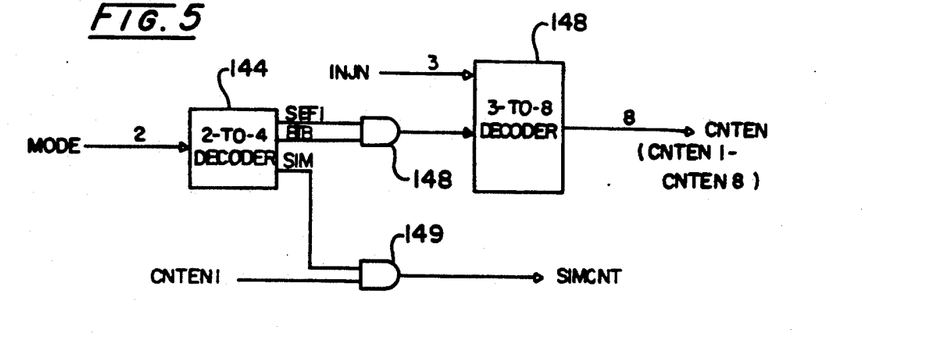
FIG. 5 is a schematic block diagram of mode selection logic for the auxiliary controller of FIG. 1.

Set up of the fuel delivery mode is achieved by setting the 2 mode selection bits of the control register 106D per the following: 00—sequential mode; 01—bank-to-bank alternate mode; and, 10—bank-to-bank simultaneous. The 11 fuel delivery mode is not currently implemented but is reserved for extension of the limited operation strategy of the controller 100. The 2 mode selection bits of the control register 106D are passed to a mode selection logic module 143 which is shown in FIG. 1 and further illustrated in FIG. 5 as comprising a 2-to-4 decoder circuit 144 for decoding to the SEFI, BTB and SIM modes of injector operation. SEFI and BTB enable a 3-to-8 decoder 146 via an AND gate 148 to decode the output of the currently enable one of the 4-bit registers making up the firing sequence register 106A which provides an injector number (INJN) to the decoder 146. For the SIM mode of injector operation, the SIM signal from the 2-to-4 decoder 144 is passed through an AND gate 149 to generate a simultaneous mode count (SIMCNT) signal.

Figure 6:
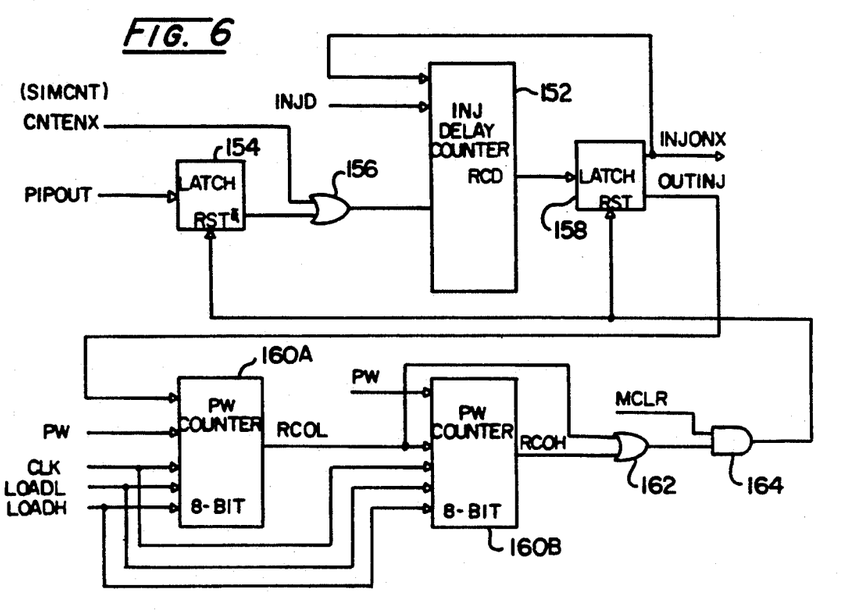
FIG. 6 is a schematic block diagram of injector on/off control logic for the auxiliary controller of FIG. 1.
Figures 7, 8:
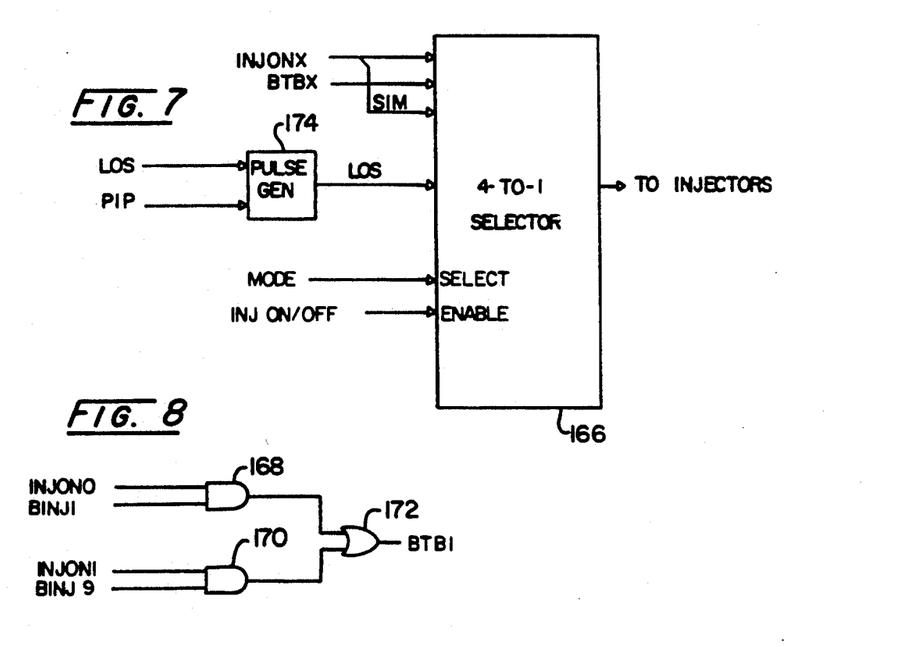
FIG. 7 is a schematic block diagram of injector control logic for the auxiliary controller of FIG. 1.
FIG. 8 is a schematic block diagram of bank-to-bank logic for the auxiliary controller of FIG. 1.

The circuitry shown in FIGS. 6 and 7 is provided for each of the fuel injectors 104 and make up the injector on/off logic 150 and the injector select logic 151 of FIG. 1. Only one set of injector on/off control logic and injector select logic is shown for ease of description and illustration. To turn on an injector associated with the circuitry shown in FIGS. 6 and 7, an injection delay counter 152 which serves as a timer for the corresponding injector is loaded with the injection delay time (INJD) currently stored in the time delay register 106E. The counter 152 is then counted down to zero, at which time, the corresponding injector is turned on.

In the preferred embodiment of the present invention, each injection delay counter 152 is loaded with the current delay time (INJD); however, the injection delay counter 152 which is currently enabled via the count enable (CNTEN) is the only counter 152 which is activated or counted down. The timer enable logic uses the rising edge of PIPOUT and the count enable (CNTEN) signal to enable the injection delay counter 152 via an injection delay enable latch 154 and an OR gate 156. The count enable signal CNTEN or injector enable is generated as previously described relative to FIG. 5. Thus, while only one injection delay counter 152 is shown, the injection delay timer consists of eight 8-bit, synchronous, up/down counters in the illustrated embodiment. Of course any reasonable number of counters corresponding to the number of injectors to be controlled can be provided.

In the illustrated embodiment, the injection delay counters are loaded with the injection delay time INJD, and allowed to count down to zero to turn-on the injectors in accordance with the firing sequence register 106A. As previously described, more than one injection delay time may be provided to the controller 100 and then the injection delay times are loaded into their corresponding injection delay counters.

When not in the load mode, each counter 152 is in the count-down mode. On the transition from a count of zero to FF, hexadecimal, the borrow signal (RCO) transitions to a high level and sets an injector on/off latch 158. Each injector on/off latch 158 controls its corresponding injector in the following manner: when set, the injector is turned on; and when cleared, the injector is turned off.

Injector turn off time is controlled by the current fuel pulsewidth (PW) data which is stored in the fuel pulse width register 106B by the primary engine control computer 102 on a periodic basis and in accordance with engine operating conditions. Pulse width timer circuitry or pulse width counters 160 serve as timers for controlling the on time of the injectors 104. The pulse width counters 160 are loaded with fuel pulsewidth (PW) data from the fuel pulse width register 106B which is then counted down to zero at which time the injectors 104 are turned off. As previously described, more than one fuel pulse width may be provided to the controller 100 and then the pulse widths are loaded into their corresponding pulse width counters.

The timer circuitry consists of eight, 16-bit counters which are constructed in the illustrative embodiment by cascading two 8-bit counters to form a lower stage 160A and a higher stage 160B which are connected to define one 16-bit counter by connecting the carry signal (RCOL) from the lower stage 160A to enable the higher stage counter 160B. Load signals LOADL and LOADH are generated by the pulse generator 142 in response to the PIPOUT signal. Of course any reasonable number of 16-bit counters corresponding to the number of injectors to be controlled can be provided.

The pulse width counters 160 are loaded at the rising edge of the PIPOUT signal. Once the pulse width counters 160 are enabled, they will count down to FF hexadecimal. The transition from low to high on the borrow line (RCOH) of the higher stage 160B will reset the injector on/off control latch 158, and thus turn off the associated injector and reset the injection delay enable latch 154. The RCOH signal passes through an OR gate 162 and an AND gate 164 which also receives a master clear (MCLR) signal.

The injector select logic 151 of FIG. 1 comprises eight 4-to-1 multiplexers or selectors only one of which, a 4-to-1 selector 166, is shown in FIG. 7 to determine the injectors firing mode (i.e., SEFI, BTB, etc.). The select lines of the 4-to-1 selector 166 are connected to the mode selection bits stored in the control register 106D. In the LOS operation mode, the LOS signal is used to force both the select lines high to select a LOS pulse. The SEFI signals to the 4-to-1 selectors are coupled to the injector on/off control latches represented by the injector on/off control latch 158. Bank-to-bank inputs are connected to bank-to-bank configuration logic one stage of which is shown in FIG. 8. Simultaneous inputs are coupled to the first injector on/off control latch, represented by the injector on/off control latch 158. The 4-to-1 selectors 166 are enabled individually by means of the injector on/off control data contained within the fuel injector on/off control register 106C.

The bank-to-bank configuration logic comprises eight stages of gates, one for each of the fuel injectors 104. The bank-to-bank configuration logic is used to determine the grouping of the injectors 104 into two banks. Thus, for the case of injector 1 of the fuel injectors 104, the configuration data stored in the bank-to-bank configuration register 106F is used to control gating based on the INJON outputs INJON0 and INJON1 since only two banks are defined in the controller 100. As illustrated for the first injector of the fuel injectors 104, if that injector is included in the first bank corresponding to BINJ1-BINJ8, the configuration data stored in the first 8-bit register of the bank-to-bank configuration register 106F, it will be activated by the combination of the BINJ1 and INJON0 signals by an AND gate 168. On the other hand, if that injector is included in the second bank corresponding to BINJ9-BINJ16, the configuration data stored in the second 8-bit register of the bank-to-bank configuration register 106F, it will be activated by the combination of the BINJ9 and INJON1 signals by an AND gate 170. the output signals from the AND gates 168, 170 are combined by an OR gate 172 to generate the BTB firing signals for the individual injectors 104. It is to be understood that comparable gate configurations are provided for each of the eight injectors even though only the gates for injector number 1 are shown in FIG. 8. Further, more than eight gate configurations are provided if more than eight injectors are to be controlled.

Limited operation strategy (LOS) is invoked at the falling edge of LOS signal indicating that the primary engine control computer 102 has malfunctioned. This signal forces the limited operation strategy (LOS) mode of operation and enables a one-shot circuit which serves as a pulse generator 174 to generate pulses for operating the injectors 104 at the rising edge of the PIP signal. All of the injectors 104 are fired simultaneously with a hardwired fuel pulsewidth associated with the pulse generator 174. To provide a LOS mode of engine operation after the engine is turned off, engine control configuration data or engine parameters are necessary and may be provided by hardwiring, ROM, or by providing a "sleep mode" or back-up power such that the auxiliary controller can maintain engine identification between engine operating periods.

While the present invention including methods of operating a control system for an internal combustion engine should be apparent in view of the foregoing description of an illustrative embodiment of the controller 100, operating methods will now be described. In accordance with the present invention, a method of controlling a plurality of electronic fuel injectors of an internal combustion engine comprises the steps of: identifying fuel injectors to be controlled; providing a current delay time from recurring events within the internal combustion engine for activating the identified fuel injectors, the delay time being dependent upon engine operation; providing a pulse width time period defining the activation times of the identified fuel injectors, the pulse width time period being dependent upon engine operation; and, applying the delay time and the pulse width time period in accordance with the identified fuel injectors to control the identified fuel injectors. The step of identifying fuel injectors to be controlled may comprise the steps of: storing a firing sequence for the internal combustion engine including the fuel injectors to be controlled; and, storing a mode of operation for the fuel injectors to be controlled.

The method may further comprise the step of storing injector enable signals to enable operation only of the fuel injectors to be controlled. In the preferred embodiment, the fuel injectors are controlled in response to a crankshaft position signal and the method further comprises the step of storing a divisor for the crankshaft position signal to adapt the crankshaft position signal to the mode of operation of the fuel injectors to be controlled.

A method of controlling a plurality of electronic fuel injectors of an internal combustion engine in response to crankshaft position signals including the identification of number one cylinder compression stroke, repetitively updated delay times from recurring positions of the crankshaft and pulse width times defining the activation times for identified fuel injectors may also comprise the steps of: storing identification of fuel injectors to be controlled; storing an operating mode for the identified fuel injectors to be controlled; generating fuel injector enabling signals in response to the crankshaft position signals; activating enabled fuel injectors after elapse of a current delay time; and, disabling activated fuel injectors after elapse of a current pulse width time.

The present invention also contemplates a method of controlling a plurality of electronic fuel injectors of an internal combustion engine from a primary control computer by the addition of a universal fuel injector controller to reduce the control operations required to be performed by the primary control computer comprising the steps of: generating initialization signals which are passed from the primary control computer to the universal fuel injector controller to identify a number of fuel injectors to be controlled and the fuel injector control mode; repeatedly generating a delay time from a recurring event within the internal combustion engine for activation of the fuel injectors and a pulse width time period defining a time period for the activation of the identified fuel injectors, delay times and pulse width times being generated by the primary control computer and passed to the universal fuel injector controller; and, applying the delay times and the pulse width times in accordance with the identified fuel injectors to control the identified fuel injectors by generation of fuel injector control signals by the universal fuel injector controller.

The step of applying the delay times and the pulse width times to control the identified fuel injectors may comprise the steps of: loading a current delay time into a delay counter corresponding to the fuel injector to be activated; loading a current pulse width time period into a pulse width counter corresponding to the fuel injector to be activated; activating the delay counter; activating the fuel injector to be activated upon the delay counter reaching a defined count; activating the pulse width counter; and, deactivating the fuel injector to be activated upon the pulse width counter reaching a defined count whereby updates of the delay times and pulse width time periods can be made at any time and are utilized for control of the next fuel injector to be activated.

Preferably, the method provides for operation of the fuel injectors in the event of failure of the primary control computer and further comprises the steps of: generating limited operation fuel control signals in accordance with a predefined delay time and a predefined pulse width time period for limited operation of the engine; and, forcing selection of the limited operation fuel control signals for controlling the fuel injectors. In a working experimental embodiment of the present invention, the predefined delay time is equal to zero.

Having thus described the present invention in detail and by reference to preferred embodiments thereof, it will be apparent that modifications and variations are possible without departing from the scope of the invention defined in the appended claims.

What is claimed is:

1. A sequential circuit universal controller for controlling a plurality of electronic fuel injectors of an internal combustion engine, said controller comprising:
   first register means for receiving and storing controller configuration data defining electronic fuel injectors to be controlled;
   second register means for receiving and storing pulse width data and time delay data required for current control of said defined electronic fuel injectors; and
   circuit means responsive to the stored contents of said first and second register means for generating control signals for said electronic fuel injectors whereby said electronic fuel injectors are controlled in accordance with current demands of said internal combustion engine which are provided to said controller via updates of data received and stored within said second register means, said circuit means including delay counters for generating signals to activate said electronic fuel injectors upon counting to a defined count set by said time delay data and pulse width counters for generating signals to deactivate said electronic fuel injectors upon counting to a defined count set by said pulse width data, and means for loading said delay counters and said pulse width counters with said time delay data and said pulse width data, respectively, prior to operation whereby said controller can be updated at any time by new pulse width data and time delay data.

2. A sequential circuit universal controller for controlling a plurality of electronic fuel injectors of an internal combustion engine as claimed in claim 1 wherein said universal controller is formed as an integrated circuit chip.

3. A sequential circuit universal controller for controlling a plurality of electronic fuel injectors of an internal combustion engine as claimed in claim 1 wherein said universal controller controls up to eight electronic fuel injectors.

4. A sequential circuit universal controller for controlling a plurality of electronic fuel injectors of an internal combustion engine as claimed in claim 1 further comprising limited engine operation means coupled to said circuit means for operating said controller with a predefined delay time and a predefined pulse width time period in the event of failure of a primary engine controller which operates said universal controller.

5. A sequential circuit universal controller for controlling a plurality of electronic fuel injectors of an internal combustion engine as claimed in claim 4 wherein said predefined delay time is equal to zero.

6. A method of controlling a plurality of electronic fuel injectors of an internal combustion engine from a primary control computer by the addition of a sequential circuit universal fuel injector controller to reduce the control operations required to be performed by the primary control computer, said method comprising the steps of:
   generating initialization signals which are passed from the primary control computer to the sequential circuit universal fuel injector controller and stored therein to identify a number of fuel injectors to be controlled and a fuel injector control mode;
   repeatedly generating a delay time from a recurring event within the internal combustion engine for activation of the fuel injectors and a pulse width time period defining a time period for the activation of the identified fuel injectors, delay times and pulse width times being generated by said primary control computer, passed to and stored in said sequential circuit universal fuel injector controller; and
   applying said delay times and said pulse width times in accordance with the identified fuel injectors to control the identified fuel injectors by generation of fuel injector control signals by said sequential circuit universal fuel injector controller by performing the steps of:
   loading a current delay time into a delay counter corresponding to the fuel injector to be activated;
   loading a current pulse width time period into a pulse width counter corresponding to the fuel injector to be activated;
   activating said delay counter;
   activating the fuel injector to be activated upon said delay counter reaching a defined count;
   activating said pulse width counter; and
   deactivating the fuel injector to be activated upon said pulse width counter reaching a defined count whereby updates of said delay times and pulse width time periods can be made at any time and are utilized for control of the next fuel injector to be activated.

7. A method of controlling a plurality of electronic fuel injectors of an internal combustion engine as claimed in claim 6 further providing for operation of the fuel injectors in the event of failure of said primary control computer, said method further comprising the steps of:
   generating limited operation fuel control signals in accordance with a predefined delay time and a predefined pulse width time period for limited operation of said engine; and
   forcing selection of said limited operation fuel control signals for controlling the fuel injectors.

8. A method of controlling a plurality of electronic fuel injectors of an internal combustion engine as claimed in claim 7 wherein said predefined delay time is equal to zero.

* * * * *